Oct. 19, 1943.   W. S. MARTIN   2,332,387
RABBLING MEANS FOR MULTIPLE HEARTH FURNACES
Filed June 27, 1941
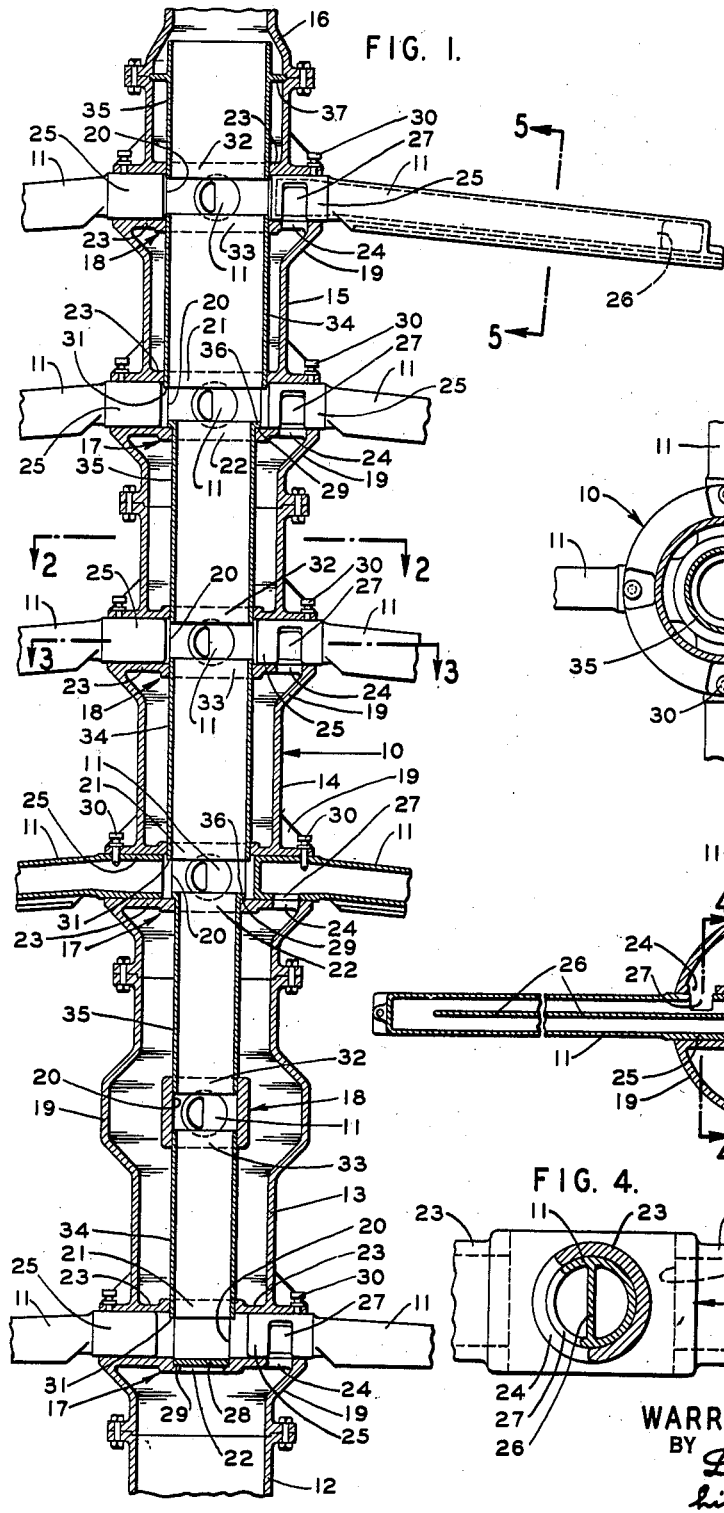
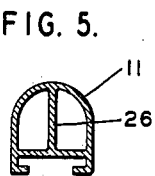
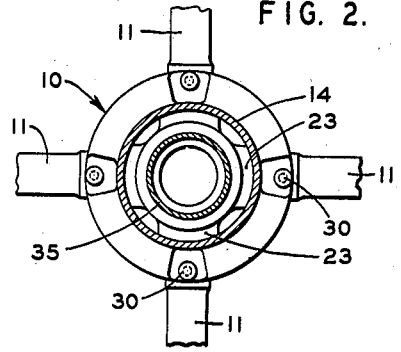
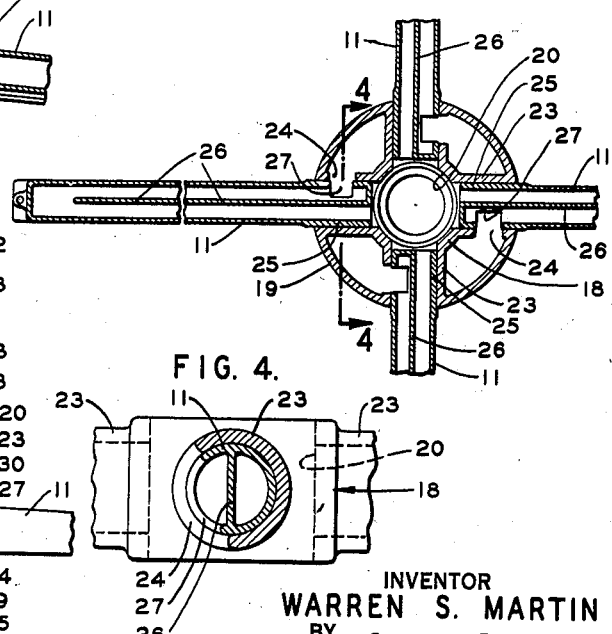
INVENTOR
WARREN S. MARTIN
BY Louis L. Ansart
his ATTORNEY Patented Oct. 19, 1943

2,332,387

UNITED STATES PATENT OFFICE 2,332,387

RABBLING MEANS FOR MULTIPLE HEARTH FURNACES

Warren S. Martin, Massapequa, N. Y.

Application June 27, 1941, Serial No. 400,067

7 Claims. (Cl. 257—120)

The present invention relates to fluid-cooled rabbling means for tiered multiple hearth furnaces and more particularly to improvements in central shaft and rabble arm structure.

Heretofore, it has been the general practice to make central shafts in large pieces which were difficult to make, to handle and to assemble. Furthermore, the cooling of many of such structures was unsatisfactory in that the flow of fluid therethrough was too small in view of the outside dimensions of the shafts. In this connection it may also be said that in such prior structures the connections between the rabbling arms and the hollow shafts were not such as to cause a proper flow of fluid through the arms and consequently through the hollow shafts.

The main object of the present invention is to provide a novel and advantageous form of rabbling means whereby disadvantages heretofore existing may be avoided. Another object is to provide a combined shaft and arm structure comprising a plurality of parts which can readily be assembled and taken apart. Another object is to provide a shaft and arm structure through which cooling fluid, such as air, can be passed in greater volume than through prior shafts of the same external dimensions. A further object is to provide a double-shell shaft of which the inner tube is in a plurality of sections readily removable one by one from the outer tube.

Another object is to provide a hollow shaft of the class referred to, in which is effected the cooling of parts requiring the same.

In carrying out the invention, the outer tube may be in sections of substantially the same diameter and the inner tube may be made up of sections which may increase in diameter in steps from one end toward the other, thereby accommodating an increased flow toward the discharge end of the inner or discharge tube. Wherever rabbling arms are to be connected to the central shaft, the corresponding section of the outer casing may be provided with a rabble arm support comprising a hollow center or central part having at the top and bottom thereof rings or sleeves to receive adjacent ends of sections of the inner shell or exhaust tube.

Extending radially from the hollow central part are hollow socket members arranged in general like spokes to permit the upward flow of gases therebetween and connecting said hollow central part with openings in the outer tube or shell. Such openings in the outer shell may be at the periphery of an enlarged portion of the outer shell extending therearound, thus providing sufficient flow space around the hollow central part and between the hollow socket members to enable the proper amount of flow of cooling fluid and effective cooling of the socket members. Cooling at such locations is of particular importance inasmuch as failures frequently occur at such points of shafts in general use. Said socket members receive the inner ends of hollow rabble arms constructed internally so that fluid such as air may be admitted into the same from the space between the shells and, after such admission, may be passed through suitable passages to the outer ends of the arms and then back and into the hollow center of the hub between the ends of the adjacent inner-tube sections. The fluid from the space between the shells may pass into an arm through a lateral opening therein in registration with a lateral opening in the wall of the corresponding socket member.

Fluid, which is not taken into the rabble arms at one of the supports, passes between socket members at that point and may enter rabble arms or another set or sets.

Preferably the outer casing, except at the rabble arm supports, is of substantially the same diameter throughout its length and the inner casing increases in diameter from the bottom to the top, thus acting to better advantage in accommodating the increasing volume of fluid or air passing upwardly through said inner or exhaust tube without interfering with the flow in the intake space between the shell members where the volume of the flow is decreasing. At the rabble arm supports the outer shell has parts of greater diameter to enable a sufficient amount of flow between the shells. It will be seen that each inner casing section is supported at one point and has a sliding connection at each other point thus avoiding difficulties arising from unequal expansion and contraction of the inner and outer casings.

Other objects, features and advantages will appear upon consideration of the following description and of the drawing in which:

Fig. 1 is a longitudinal section through a vertical hollow shaft constituting one embodiment of my invention;

Fig. 2 is a section taken along the line 2—2 of Fig. 1;

Fig. 3 is a section taken along the line 3—3 of Fig. 1;

Fig. 4 is a section taken along the line 4—4 of Fig. 3; and

Fig. 5 is a section taken along the line 5—5 of Fig. 1.

In the drawing there is illustrated a double-shell fluid-cooled shaft 10 carrying rabbling arms 11. This structure is adapted for use in a multiple hearth furnace with the shaft 10 arranged vertically at the axis of the furnace and with the rabbling arms 11 positioned so as to operate on material on the corresponding hearths of the furnace (not shown). In accordance with the general practice the shaft 10 and rabble arms 11 are fluid-cooled. Such cooling may be effected by passing the cooling fluid, such as air, either upwardly or downwardly through the shaft. Usually, however, the fluid is passed upwardly through the shaft and that practice is followed in the structure disclosed herein.

The outer shell of the shaft may be of relatively uniform overall diameter from the bottom to the top and the utmost capacity of the entire shaft may be had by increasing from stage to stage the size of the inner shell, the space between the outer shell and the inner shell constituting an intake duct and the part at the interior of the inner shell constituting an exhaust duct. Although the supply and exhaust ends of the center shaft 10 may be reversed or both may be combined at one end, the arrangement disclosed is best suited for use in connection with a furnace which has higher temperatures in its lower portion.

The outer shell may comprise a lowermost section 12 and, arranged in order above the same, sections 13, 14 and 15, each carrying at least two sets of rabble arms. At the upper end the shaft may be completed by a top section 16. Said sections 12, 13, 14, 15 and 16 may be secured together as by bolts passing through abutting flanges at adjacent ends of each pair of sections. Each of the sections 13, 14, and 15 of the outer shell is designed to carry rabble arms 11 at two different levels. As illustrated, outer shell section 13 is provided with two rabble arm supports 17 and 18. The lower rabble arm support 17 may comprise an enlarged portion 19 of the outer shell, a hollow central portion 20 having at its top a sleeve 21 and at its bottom a sleeve 22 and one or more radially arranged socket members 23 opening into the interior of the central portion 20, the interior of the outer shell through an opening or port 24 and into the open air at the outer end.

The socket members 23 may receive the inner ends 25 of corresponding rabble arms 11. As illustrated in Figs. 1, 3, 4 and 5, each rabble arm is provided with a passage extending from a lateral opening corresponding with port 24 to a point near the outer end of the arm and then back to the inner end of the arm where it communicates with the interior of the hollow central portion 20. In the form illustrated this arrangement is effected by means of a vertical partition 26 (Fig. 3) extending from the inner end to a point near the outer end of the rabble arm, and by provision of a lateral opening 27 at one side of the partition 26 in substantial register with the port 24 in the side of the corresponding socket member.

At the side of the partition 26 adjacent to the opening 27, the inner end of the rabble arm is closed so that air admitted through the port 24 will pass along the partition 26 to the outer end of the rabble arm and then back along the other side of the partition to the hollow central portion 20 of the rabble arm support. Inasmuch as this rabble arm support is the lowermost of such supports, the sleeve 22 at the bottom thereof may be closed by means of members 28 resting on a suitable seat 29 at the top of said sleeve. The rabble arms 11 may be held in position by suitable pins 30, as best illustrated at the lower part of section 14 in Fig. 1.

As illustrated, there is at the bottom of the top sleeve 21 an annular seat 31 to support a section of the inner tube, said seat 31 having an internal diameter which is substantially the same as the external diameter of the lower seat 29. This difference in internal diameter renders it much easier to assemble and disassemble the internal shell, as will be brought out hereinafter.

The hollow central portion of the rabble arm support 18 has at its top and bottom sleeves 32 and 33 respectively, these sleeves being in axial alignment, that is coaxial, and having the same internal diameter as top sleeve 21 of the lowermost rabble arm support.

Inasmuch as the rabble arm supports of sections 14 and 15 are substantially the same as those of section 13 except for differences in the number of socket members and differences in diameter of certain sleeves and seats, the parts of the rabble arm supports of sections 14 and 15 will be designated by the same reference numerals as corresponding parts of the rabble arm supports of section 13.

In this connection, it should be understood that all of the rabble arm supports may have the same number of sockets and that, if it be desired to use less than the full number of sockets, the sockets not to be used may be closed by plugs (not shown) adapted to seal the outer and inner ends of the sockets and also the lateral inlet openings 24.

Important features of the present invention relate to construction of the inner tube or exhaust manifold in sections and the support of these sections in the outer tube or shell, to avoid difficulties which might otherwise arise from different rates of expansion and contraction in the two shells. It is also important to have the parts so constructed and arranged that parts may be inserted and removed without obstruction by other parts. Although such results may be obtained in various ways, it has been found advantageous to do so by the use of sleeves and seats of progressively increasing diameter from the bottom to the top of the outer shell, as described hereinbefore, and by the use of various tubular sections in the inner tube or shell as will now be described.

The construction of the inner tube or exhaust manifold and its connection with the outer shell may be in accordance with the following description of the illustrated embodiment of the invention. The lowermost section 34 of the inner tube may be a plain tube of such diameter that its lower end may fit in the top sleeve of the support 17 of the section 13 and rest on the seat 31, and of such length that its upper end will enter the bottom sleeve 33 of the support 18. By this arrangement the connection at the upper end of inner-tube section 34 is a sliding one and no difficulties will arise from differences in rates of expansion and contraction.

The section 34 might, of course, be supported in other ways but the present arrangement has certain advantages which will be made apparent.

Above the section 34 is a section 35 having a tubular body of the same diameter as 34 so that its lower end may fit the top sleeve 32 of the rabble arm support 18 of the section 13, its upper end may fit in the bottom sleeve 22 of support 17 of section 14, and it may be supported by means of an external flange 36 resting on a corresponding seat 29. The construction of the inner tube within section 14 is substantially the same as of the part just described except that the inner tube sections are of sufficient internal diameter to permit the lowermost sections 35 and 34 to be removed or inserted. The inner tube sections of the section 15 are sufficiently greater in diameter than those of section 14 to enable removal and insertion of the inner tube sections of outer shell section 14.

Inasmuch as section 15 is the topmost outer-shell section the inner-tube section 35 above the corresponding arm support 18 cannot be supported in the usual way. However, this problem may be met by providing this inner tube section with a circular external flange 37 to rest on the top of section 15 and be clamped in place between the adjacent flanges of sections 15 and 16. Preferably section 16 is in general of substantially the same diameter as the uppermost section 35, but is flared at its lower end to cooperate with the upper end of section 15. The flange 37 also serves to close the adjacent end of the air intake manifold.

It should be noted that the stepped increase in diameter of the inner tube sections from bottom to top of the shaft not only facilitates the assembly and taking apart of the structure but also effects a desired increase in capacity of the inner tube from bottom to top to handle the increasing amounts of cooling fluid and a corresponding decrease in flow space from bottom to top of the intake manifold. The hollow central portions 20 of the rabble arm supports and the socket members 23 would tend to restrict the flow of cooling fluid or aid, but this difficulty is overcome by providing the enlarged portions or bulges 19 of the outer shell which, as shown in Figs. 1, 2 and 3, assures thorough cooling of such parts by the cooling fluid.

It will be evident that the present invention provides a hollow shaft and rabble arm structure which is economical to manufacture, easy to assemble and take down, and is efficient in operation.

It should be understood that various changes may be made and that various features may be used without others, without departing from the true scope and spirit of the invention.

What I claim is:

1. A fluid-cooled shaft to operate rabble arms projecting therefrom, comprising an outer shell, an inner shell dividing the interior of the outer shell into an intake duct between the shells and a discharge duct enclosed by said inner shell, said outer shell being provided at one level with an openwork rabble arm support comprising an enlarged portion of the outer shell, a hollow central portion with coaxial sleeves one at the top and the other at the bottom thereof, and hollow radial socket members supporting said central portion from said enlarged portion and having open inner and outer ends and an opening communicating wtih said intake duct, said inner shell comprising a section having its lower end fitting slidably in the top sleeve and another section with its upper end in the bottom sleeve, and means for supporting said inner shell sections, so that they can be withdrawn upwardly one by one without taking apart the corresponding portions of the outer shell.

2. A fluid-cooled shaft to operate rabble arms projecting therefrom, comprising an outer shell, an inner shell dividing the interior of the outer shell into an intake duct between the shells and a discharge duct enclosed by said inner shell, said outer shell being provided at one level with an openwork rabble arm support comprising an enlarged portion of the outer shell, a hollow central portion with coaxial sleeves one at the top and the other at the bottom thereof, and hollow radial socket members supporting said central portion from said enlarged portion and having open inner and outer ends and an opening communicating with said intake duct, said inner shell comprising a section having its lower end fitting in the top sleeve and another section with its upper end in the bottom sleeve, and means for supporting each of said inner shell sections at one end only with a sliding connection at the other end, including at the lower part of the top sleeve supporting means on which the lower end of the corresponding inner shell section rests.

3. A fluid-cooled shaft to operate rabble arms projecting therefrom, comprising an outer shell, an inner shell dividing the interior of the outer shell into an intake duct between the shells and a discharge duct enclosed by said inner shell, said outer shell being provided at one level with an openwork rabble arm support comprising an enlarged portion of the outer shell, a hollow central portion with coaxial sleeves one at the top and the other at the bottom thereof, and hollow radial socket members supporting said central portion from said enlarged portion and having open inner and outer ends and an opening communicating with said intake duct, said inner shell comprising a section having its lower end fitting in the top sleeve and another section with its upper end in the bottom sleeve, and means for supporting each of said inner shell sections at one end only with a sliding connection at the other end including seating means around the top of the bottom sleeve and laterally projecting means on the upper end of the corresponding inner shell section to rest on said seating means and support such shell section.

4. In combination, a fluid cooled shaft to operate rabble arms projecting therefrom, comprising an outer shell, an inner shell dividing the interior of the outer shell into an intake duct between the shells and a discharge duct enclosed by said inner shell, said outer shell being provided at one level with an openwork rabble arm support comprising an enlarged portion of the outer shell, a hollow central portion with coaxial sleeves one at the top and the other at the bottom thereof, and at least one hollow radial socket member supporting said central portion from said enlarged portion and having open inner and outer ends and an opening communicating with said intake duct, said inner shell comprising a section having its lower end fitting in the top sleeve and another section with its upper end in the bottom sleeve, and means for supporting each of said inner shell sections at one end only with a sliding fit at the other end; and a rabble arm having an open inner end fitting into said socket members and provided with a transverse opening substantially in register with said opening in the socket member communicating with the intake duct, said rabble arm being provided at its interior with a passage leading from said transverse opening to the outer end of the arm and back to said open inner end, the parts being separated by a vertical partition.

5. A double-shell fluid-cooled shaft to operate rabble arms projecting therefrom, comprising a plurality of outer shell sections connected end to end and a plurality of inner shell sections dividing the interior of the outer shell into an intake duct between the shells and a discharge duct enclosed by said inner shell, each section of said outer shell being provided at each of two levels with an openwork rabble arm support comprising an enlarged portion of the outer shell, a hollow central portion with coaxial sleeves one at the top and the other at the bottom thereof, and hollow radial socket members supporting said central portion from said enlarged portion and having open inner and outer ends and an opening communicating with said intake duct, the coaxial sleeves of the upper rabble arm support being of the same diameter and the sleeves of the lower rabble arm support being of different size, the upper one being of the same diameter as for the upper rabble arm support and the lower one being of smaller diameter by the thickness of the wall of the inner shell section so that the lower inner shell section fitting therein can be withdrawn upwardly through the next higher inner shell section, each of such inner shell sections being supported at one end only and having a sliding fit at its outer end.

6. A double-shell rabble-arm-carrying shaft comprising a plurality of outer-shell sections connected end to end, and provided at intervals with openwork rabble arm supports each comprising an enlarged portion of the outer shell, a hollow central portion with coaxial sleeves one at the top and the other at the bottom and hollow radial socket members supporting said hollow central portions and opening to the inside of said central portion, to the outside of the outer shell through such enlarged portions and to the space between the shells, said coaxial sleeves of the rabble arm supports increasing in diameter by steps from the inlet end to the outlet end of the shaft and a plurality of inner shell sections of different diameters slidably fitting at one end in adjacent sleeves of successive supports, shell sections decreasing in diameter from the top down, and means for supporting said inner shell sections for maintaining such slidable connection between at least one end of each inner-shell section and the corresponding sleeve, but permitting upward removal and downward supply of lower sections through upper sections.

7. In a double-shell, fluid-cooled shaft to operate rabble arms projecting therefrom, the combination of an outer shell section having at one level an enlarged hub section comprising a central hub with circular openings at the top and bottom thereof and radial socket members supporting the hub from said enlarged hub section, an inner casing member with a flange resting on the top of the outer shell member and with its lower end slidable in the upper circular opening in said hub and a lower inner casing member with its upper end slidable in the circular opening in the bottom of said hub, and means for supporting the lower end of said lower inner casing member.

WARREN S. MARTIN.